B. E. TENNENT.
ASSAY FURNACE.
APPLICATION FILED AUG. 22, 1908.

944,470.

Patented Dec. 28, 1909.
3 SHEETS—SHEET 1.

UNITED STATES PATENT OFFICE.

BRUCE EDWARD TENNENT, OF KNIGHTS, TRANSVAAL.

ASSAY-FURNACE.

944,470.

Specification of Letters Patent.   Patented Dec. 28, 1909.

Application filed August 22, 1908.   Serial No. 449,798.

*To all whom it may concern:*

Be it known that I, BRUCE EDWARD TENNENT, a subject of the King of Great Britain, and resident of Knights, Transvaal, have invented certain new and useful Improvements in Assay-Furnaces, of which the following is a specification.

This invention relates to assay-furnaces and in particular to a fusion or crucible furnace.

With the object of reducing the working costs, the furnace is more particularly designed for burning coal, although any other suitable fuel may be used. In addition to effecting a very considerable reduction in the cost of fuel, the initial cost of a furnace constructed in accordance with my invention is less than that of existing furnaces and the life of the crucibles is considerably prolonged.

The features of my invention consist, firstly, in the employment of easily removable and renewable bars of firebrick or other suitably refractory material (which are preferably arranged in two or more tiers) for supporting the crucibles within the furnace in such a way that the flames and heated gases come directly into contact with the crucibles; and secondly, in providing in the ash-pit of the furnace a rack or its equivalent for annealing or preheating and cooling the crucibles before placing them in or after withdrawing them from the furnace. The more important advantages accruing to the first feature are (a) the economy effected in the fuel required for heating the furnace and the saving of time necessary for fusing the charges in the crucibles, and (b) the greater accuracy in the assays resulting from the even distribution of the heat throughout all the crucibles in the chamber. The advantage accruing to the second feature is that by utilizing the waste heat of the ash-pit to anneal or preheat the crucibles before placing them in the furnace and to gradually cool them after removal from the furnace, I obviate the frequent breakages due to the sudden heating and cooling.

Figure 1:
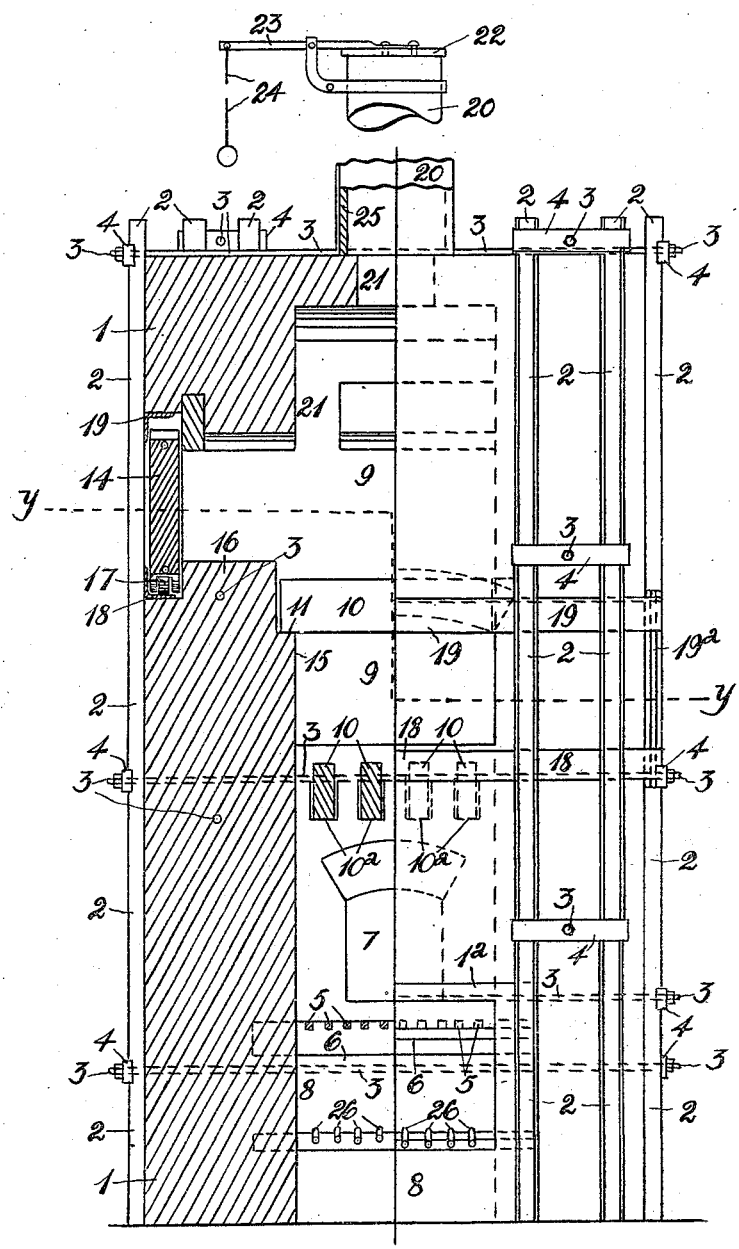
Figure 2:
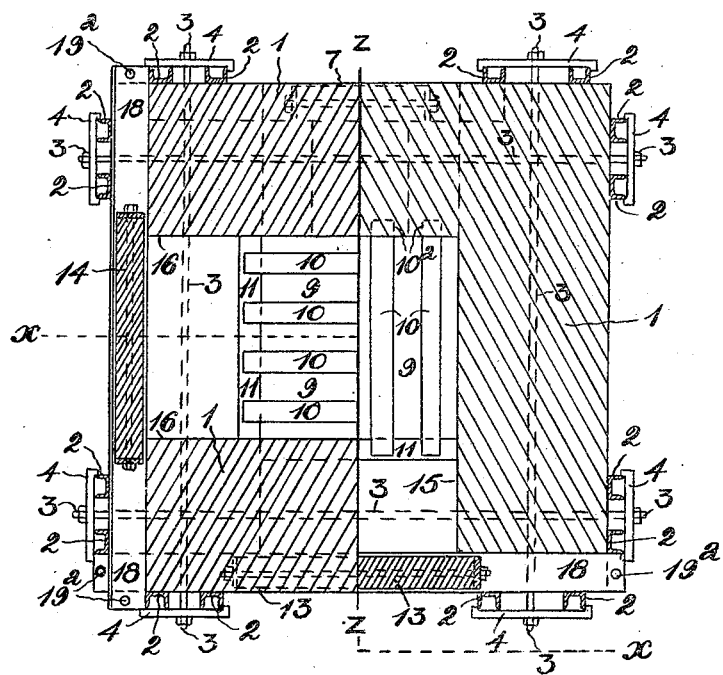
Figure 3:
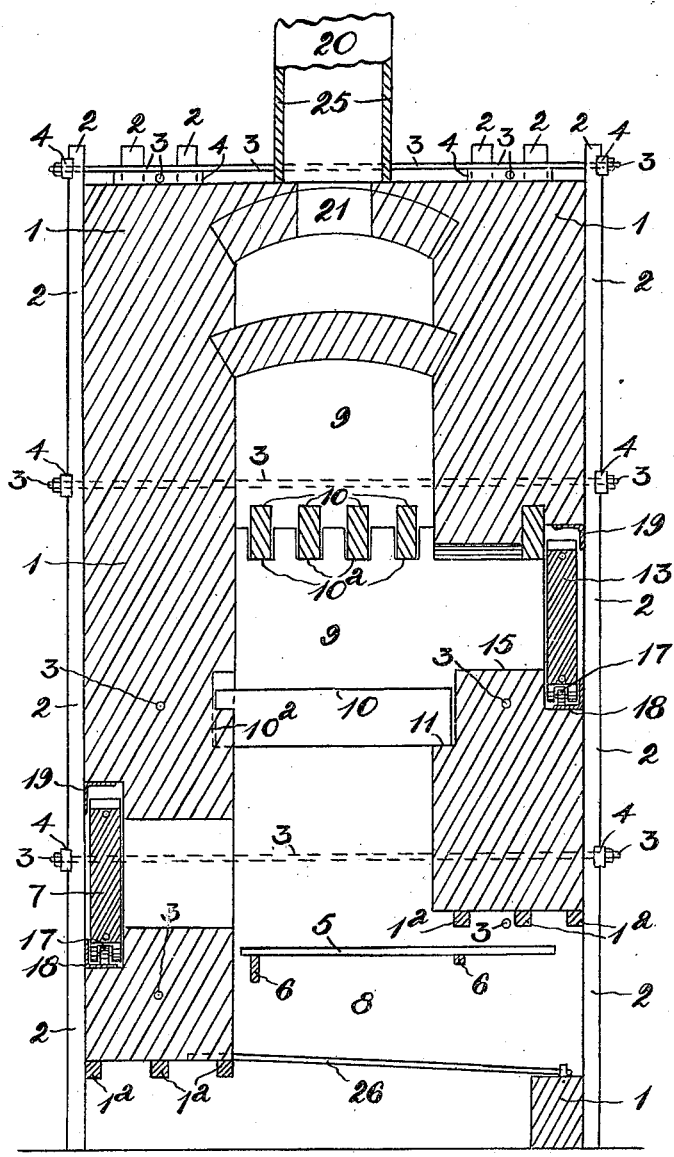

The invention will now be more fully described by aid of the accompanying drawings in which, Figure 1 is an elevation, partly in section, of the furnace, the plane of section being indicated by the line $x$—$x$ in Fig. 2. Fig. 2 is a sectional plan, the plane of section being indicated by the line $y$—$y$, Fig. 1, and Fig. 3 is a sectional elevation of Fig. 1 on the line $z$—$z$.

1 represents the brickwork of the furnace which is bound and strengthened by means of buck-stays 2 (shown of channel section), tie rods 3 and crosspieces 4. The stays and tie rods, as shown, are provided vertically and horizontally of the structure.

$1^a$ represent bars for supporting portions of the brickwork.

5 represents the bars of the firegrate of the furnace and 6 the bearers therefor supporting the same at or in proximity to their extremities.

7 is the firing door of the furnace and 8 the ashpit.

9 is that portion of the furnace in which the supports for the crucibles are arranged. The supports consist of easily removable bars 10 of firebrick or other suitable refractory material. In the arrangement illustrated the bars 10 are arranged in two tiers immediately above the firegrate surface. The lower set of bars 10 at their inner ends are seated within recesses $10^a$ formed in the internal walls of the furnace and at their other ends rest upon a ledge or projection 11 formed on the furnace wall. The upper set or tier of bars 10, which is arranged at right angles to the lower set, is in like manner positioned in recesses $10^a$ in the side walls of the furnace at their inner ends and rest on a corresponding ledge 11 at their other ends. 13 and 14 are the doors (hereinafter designated the "working doors" of the furnace) for closing the apertures 15, 16, through which access is obtained to insert or remove the crucibles. The apertures 15, 16, are shown at right angles, although they may be otherwise arranged. The working doors 13, 14, and also the firing door 7 are shown provided at the bottom with rollers 17, which traverse an angleiron 18 fixed in the brickwork of the furnace, a corresponding angleiron 19 being fixed in the furnace to serve as a guide for the top of the door.

$19^a$ represents vertical bolts between the ends of the angleirons 18, 19, serving as stops for limiting the movement of the door. By this construction the several doors are opened laterally, which permits the furnace to be worked with the door only partially opened.

20 is the stack or chimney of the furnace and 21 the uptake leading from the top of the crucible chamber 9 to the stack. The stack 20 is preferably fitted with a lid damper 22 actuated through lever 23 and chain or equivalent 24 for regulating the draft through the furnace or for closing it when desired. A fireclay or other suitable pipe 25 may, if desired, be used as a lining for the lower portion of the smoke stack 20.

In the ashpit 8 of the furnace is provided a rack 26, shown comprising a plurality of fixed parallel rods, for annealing the crucibles or gradually heating or cooling the same before inserting them in and after withdrawing them from the furnace, by means of the waste heat.

What I claim as my invention and desire to protect by Letters Patent is:—

In an assay-furnace such as described, a plurality of bars of refractory material arranged in sets or tiers at right angles and directly above the firegrate, said bars being supported in recesses and opposing ledges in the walls of the furnace, an aperture for each set or tier, said apertures being arranged at right angles, working doors for closing said apertures, said doors being provided with rollers and the furnace with guides to permit of the door being opened horizontally, stops for limiting the movement of the door in either direction, and a rack in the ashpit of the furnace for gradually heating and cooling the crucibles by the waste heat, as set forth.

In testimony whereof I have signed my name to this specification in the presence of two subscribing witnesses.

BRUCE EDWARD TENNENT.

Witnesses:
CHAS. OVENDALE,
R. OVENDALE.